United States Patent [19]

Föhl

[11] 4,230,288
[45] Oct. 28, 1980

[54] RE-TIGHTENER WITH PYROTECHNIC PROPELLANT CHARGE FOR SAFETY-BELT AUTOMATIC WIND-UP DEVICES

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 26,077

[22] Filed: Apr. 2, 1979

[30] Foreign Application Priority Data

Apr. 4, 1978 [DE] Fed. Rep. of Germany ....... 2814487

[51] Int. Cl.³ ...................... A62B 35/00; B65H 75/48
[52] U.S. Cl. ............................. 242/107; 242/107.4 R; 280/807
[58] Field of Search .................. 242/55, 107–107.7; 280/801–808; 297/388; 244/122 B

[56] References Cited

U.S. PATENT DOCUMENTS 4,151,967 5/1979 Lindblad ................. 242/107.4 R

FOREIGN PATENT DOCUMENTS 2505626 8/1976 Fed. Rep. of Germany .... 242/107.4 R
2535380 2/1977 Fed. Rep. of Germany .... 242/107.4 R
2618119 10/1977 Fed. Rep. of Germany .......... 242/107

Primary Examiner—John M. Jillions
Attorney, Agent, or Firm—Herbert L. Lerner

[57] ABSTRACT

Retightener with a pyrotechnic propellant charge for automatic safety-belt wind-up devices having an energy converter, wherein in the event of danger the explosive pressure of the ignited propellant charge acts on a pull-out element tightening the safety belt around the body of the vehicle passenger to be protected via a liquid buffer arranged between the propellant charge and a pull-back element. In accordance with the invention a turbine housing is disposed around the turbine wheel with a hollow space on one side between the turbine wheel and the wall of the housing to form a turbine pressure chamber. A receptacle containing liquid medium has its outlet opening into the turbine pressure vessel. The outlet of the receptacle is aligned substantially tangentially to the turbine wheel.

5 Claims, 4 Drawing Figures

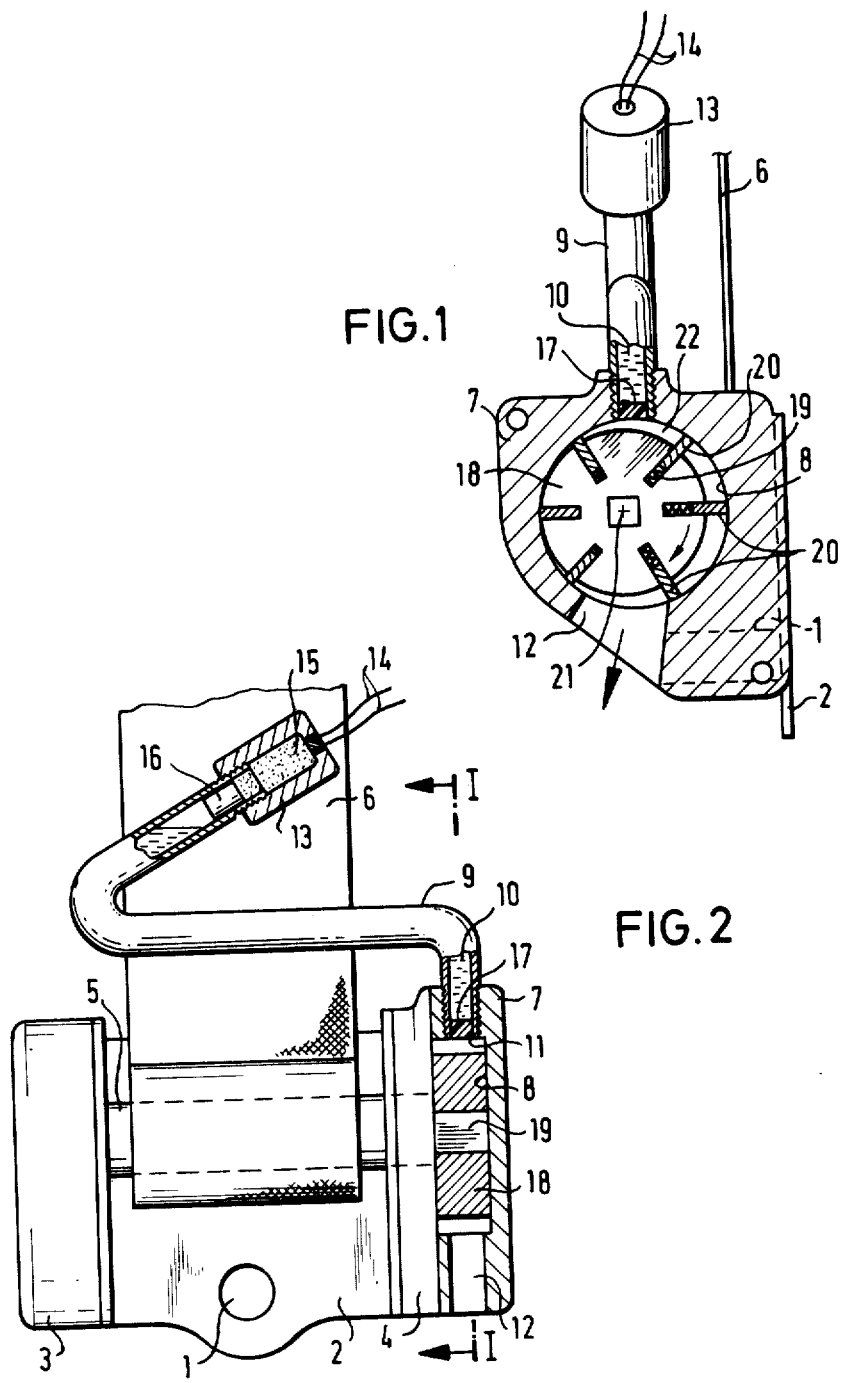

RE-TIGHTENER WITH PYROTECHNIC PROPELLANT CHARGE FOR SAFETY-BELT AUTOMATIC WIND-UP DEVICES

CROSS-REFERENCE TO RELATED APPLICATION

The following application, assigned to REPA Feinstanzwerk GMBH, the assignee of the present application, is hereby incorporated by reference: U.S. Application Ser. No. 834,794, filed for Artur Föhl, on Sept. 19, 1977.

FIELD OF THE INVENTION

The invention relates to a retightener or pullback device with a pyrotechnic propellant charge for safety-belt automatic wind-up devices having an energy converter, wherein in the event of danger the explosive pressure of the ignited propellant charge acts on a pullback element tightening the safety belt around the body of the vehicle passenger to be protected, via a liquid buffer arranged between the propellant charge and a pullback element.

DESCRIPTION OF THE PRIOR ART

In the above-mentioned pullback device according to related U.S. Application Ser. No. 834,794, the liquid buffer or liquid medium is thrown against a free-standing turbine wheel through a jet nozzle by the firing of the propellant charge in the event of danger, whereby the pullback element is set in rotation and the safety belt is tightened around the body of the vehicle passenger.

In other known pullback devices (German Published Non-Prosecuted Applications 24 60 119 and 26 25 573), a backward torque is obtained by means of radial discharge canals machined into a turbine wheel. In the event of danger, i.e., after a propellant charge is ignited, gaseous or liquid medium escapes from the canals and thereby imparts a rotary impulse to the turbine wheel. Such pullback devices are very costly because of the complicated design of the turbine wheel and have relatively low efficiency.

SUMMARY OF THE INVENTION

It is an object of the present invention to provide a pullback device of the type described, with increased torque acting on the pullback device without substantial increase in cost.

With the foregoing and other objects in view, there is provided in accordance with the invention, a retightener for safety-belt automatic wind-up devices having a winding shaft mounted in a bearing block, a safety belt wound around the shaft, a retightening element connected to the shaft, with a pyrotechnic propellant charge which when activated by firing the charge generates an explosive pressure on the retightening element in the form of a turbine wheel connected to the winding shaft to tighten the safety belt around the body of a motor vehicle passenger to be protected and a liquid medium disposed intermediate the retightener and the pyrotechnic charge, including a turbine housing disposed around the turbine wheel with a hollow space on one side between the turbine wheel and the wall of the housing to form a turbine pressure chamber, a receptacle containing liquid medium with the outlet of the receptacle opening into the turbine pressure vessel, and with the outlet of the receptacle aligned substantially tangentially to the turbine wheel.

Other features which are considered as characteristic for the invention are set forth in the appended claims.

Although the invention is illustrated and described herein as embodied in a retightener with pyrotechnic propellant charge for safety-belt automatic wind-up devices, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 shows the pullback device in accordance with the invention in a cross-sectional view taken along line I—I of FIG. 2, FIG. 2 shows a top view in partial section of the pullback device.

DETAILED DESCRIPTION OF THE INVENTION

Figure 3:
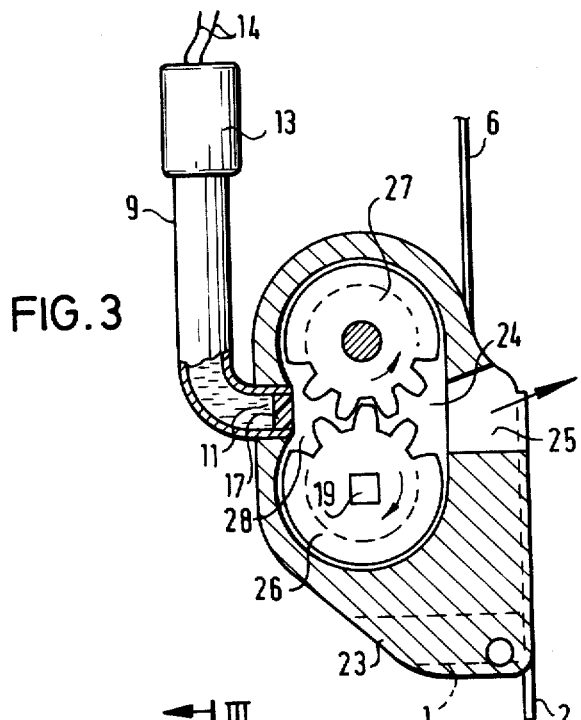
FIG. 3 is another embodiment of the pullback device shown in cross-section in a view taken along line III—III of FIG. 4.

According to the invention, the outlet opening of the receptacle containing the buffer liquid leads into a turbine pressure chamber closed by the turbine wheel and is aligned substantially tangentially to the turbine wheel. In this closed system, the liquid buffer pumped by the explosive pressure of the propellant charge has no way to escape. The liquid buffer strikes the radially extending turbine blades of the turbine wheel practically without loss and imparts to them a torque which corresponds to the liquid pressure of the entire accelerated amount of liquid.

According to one embodiment of the invention, the turbine wheel which is eccentrically supported in a housing bore of a turbine housing, has radial vanes which can be displaced under spring action and which are braced resiliently against the wall of the housing bore, forming the turbine pressure chambers. The vanes present on both sides of the outlet opening of the receptacle containing the liquid buffer, together with the cylindrical wheel body and the wall of the housing bore, form a closed turbine pressure chamber, into which the liquid accelerated by the explosive pressure is pushed.

The inflowing liquid drives the turbine wheel in a predetermined direction of rotation practically without loss due to the eccentric mounting of the turbine wheel in the housing bore. The resiliently adjustable vanes ensure the sealing of the turbine pressure chamber.

In a further embodiment of the invention, it is ensured that practically no friction losses occur while the turbine wheel rotates, by constructing the turbine wheel which is mounted, at least in part, in a turbine housing, as a gear which meshes with another gear in the manner of a gear drive and closes off, together with the meshing gear, the turbine pressure chamber which has the outlet opening of the liquid buffer. Here, a particularly high efficiency is obtained if the outlet opening of the receptacle containing the liquid buffer is arranged in the meshing plane of the gear drive.

Further advantageous details of the invention will be seen from the embodiment examples which are described in the following and are depicted in the drawings.

Referring to FIGS. 1 and 2, a fitting or anchoring plate 2 of an automatic safety-belt wind-up device can be fastened by means of a bolt, not shown, through a hole 1 to the body frame of a motor vehicle. Support extensions 3 and 4 are arranged on both sides of plate 2 and a winding shaft 5 for the safety belt 6 is rotatably mounted in support extensions 3 and 4. Firmly connected to the bearing extension 4 is a turbine housing 7 with a housing bore 8 closed to the outside. A tube 9 opens into this housing bore 8 on one side. Tube 9 is bent in an S-shape and represents a receptacle for a liquid buffer or medium 10 and is preferably filled with a substantially non-compressible liquid. An outlet opening 12 is provided on the housing side opposite the outlet opening 11 of the tube 9. At the free end of the tube 9 forming the receptacle for the liquid buffer, there is a propulsion cylinder 13 with an ignition cable 14 and an ignitable medium 15. Between the ignition chamber of the propulsion cylinder 13 and the tube 9, there is a drive piston 16. The outlet opening 11 is closed off by a plug 17 which consists of a mechanically easily deformable material, for instance, silicone plastic.

Mounted in the housing bore 8 is a turbine wheel 18, which is connected to the winding shaft 5 by means of a square stub 21. As shown clearly in FIG. 1, the turbine wheel 18 has several vanes 20 which can be displaced in radial slots of the disc-like wheel body under the action of springs 19. The axis of square stub 21 of the turbine wheel 18 is arranged eccentrically with respect to the housing bore 8 in such a manner that hollow spaces remain on the one side of the axis 21 between the turbine wheel 18 and the wall of the housing and gradually decrease toward the other side of the axis. These cavities represent turbine pressure chambers 22, of which each individual one is closed off on both sides by the vanes 20, which vanes are braced against the wall of the bore under spring pressure. One turbine pressure chamber 22 is always in the vicinity of the outlet opening 11 of the tube 9. If now the propellant charge is ignited, the drive piston 16 is moved toward the tube 9, while the liquid buffer 10 pushes the plug 17 out of the outlet opening 11 and flows into the turbine pressure chamber at high pressure. Due to the eccentric mounting of the turbine wheel 18 and due to the largely tangential alignment of the outlet opening 11 toward the turbine wheel 18, the latter is forced to rotate in the direction of the arrow in FIG. 1 by the high liquid pressure in the turbine pressure chamber 22 which is closed on all sides. The small plug 17 is taken along and is removed to the outside through the outlet opening 12 along with the liquid. Through this rotation of the turbine wheel 18 and thereby, the winding shaft 5, the safety belt 6 is tightened around the body of the vehicle passenger to be protected.

Figure 4:
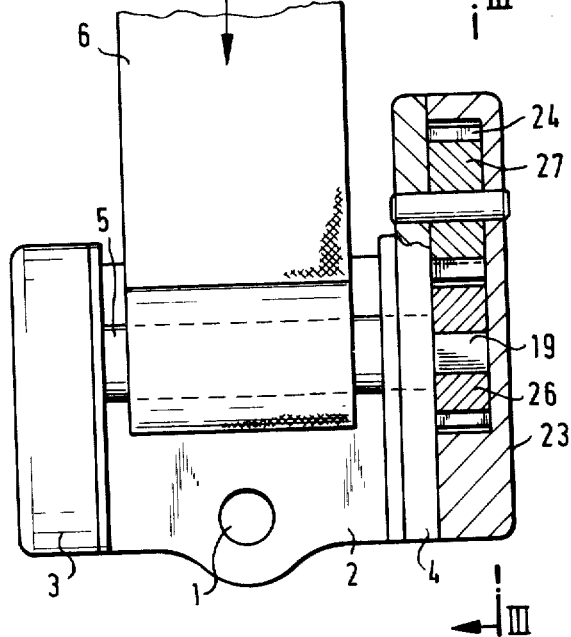
FIG. 4 is a top view in partial section of the embodiment of FIG. 3.

In the embodiment example according to FIGS. 3 and 4, support extensions 3 and 4 are again arranged on both sides of a fitting plate 2 of a safety-belt automatic wind-up device. A housing 23 is again fastened to the support extension 4. This housing has a housing interior 24 in the form of an elongated hole, into which opens on the one side the outlet opening 11, closed off by a mechanically easily deformable plastic plug 17. Tube 9 forms a receptacle for a liquid buffer and is provided, as in FIGS. 1 and 2, with a propellant charge 13/14. A liquid discharge opening 25 is provided on the opposite housing side, as is clearly shown in FIG. 3. Mounted in the interior 24 of the housing is a gear drive consisting of a first gear 26 which represents the turbine wheel which is antirotationally connected to the winding shaft 5 via a square stub 21, and of a second, freely rotating gear 27 which meshes with the turbine wheel 26. The outlet opening 11 and the outlet opening 25 lie in the meshing plane of the gear drive. The turbine wheel 26, realized as a gear, together with the meshing gear 27, closes off a turbine pressure chamber 28 which is connected directly to the outlet opening 11 and into which the liquid buffer, together with the plug 17 pushed out of the outlet opening 11, flows under high pressure after the propellant charge 13/14 has been ignited. The gear drive is thereby moved in the direction of the arrows. The plug 17 consists of a readily deformable, for instance, elastic material, so that the gear drive can pull this plug 17 through and eject it through the outlet opening 25. With the rotation of the gear drive, the belt 6 is tightened again.

There are claimed:

1. In a retightener for safety-belt automatic wind-up devices having a winding shaft mounted in a bearing block, a safety belt wound around the shaft, a retightening element connected to the shaft, with a pyrotechnic propellant charge which when activated by firing the charge generates an explosive pressure on the retightening element, said retightening element being in the form of a turbine wheel connected to the winding shaft to tighten the safety belt around the body of a motor vehicle passenger to be protected and a liquid medium disposed intermediate the retightener and the pyrotechnic charge, the improvement comprising a turbine housing disposed around the turbine wheel with a hollow space on one side between the turbine wheel and the wall of the housing to form a turbine pressure chamber, a receptacle containing liquid medium with the outlet of the receptacle opening into the turbine pressure vessel, and with the outlet of the receptacle aligned substantially tangentially to the turbine wheel, wherein the turbine wheel is eccentrically mounted in a symmetrical housing bore of the turbine housing, and wherein the turbine wheel has vanes which can be displaced under the action of springs, which vanes are braced against the wall of the housing bore, and wherein the turbine housing has an outlet opening for the discharge of liquid on the side opposite the outlet of the receptacle for introduction of liquid medium into the turbine pressure chamber, and wherein a cross-section of said hollow space has a crescent shape with one end of the crescent terminating beyond the outlet of the receptacle for introduction of liquid medium into the turbine pressure chamber and the other end of the crescent terminating beyond said outlet for the discharge of liquid.

2. In a retightener for safety-belt automatic wind-up devices having a winding shaft mounted in a bearing block, a safety belt wound around the shaft, a retightening element connected to the shaft, with a pyrotechnic propellant charge which when activated by firing the charge generates an explosive pressure on the retightening element, said retightening element being in the form of a turbine wheel connected to the winding shaft to tighten the safety belt around the body of a motor vehicle passenger to be protected and a liquid medium disposed intermediate the retightener and the pyrotechnic charge, the improvement comprising a turbine housing disposed around the turbine wheel with a hollow space on one side between the turbine wheel and the wall of the housing to form a turbine pressure chamber, a receptacle containing said liquid medium with the outlet of the receptacle opening into the turbine pressure vessel, and with the outlet of the receptacle aligned substantially tangentially to the turbine wheel, and wherein the turbine wheel is constructed as a gear which meshes in the manner of a gear drive with a meshing gear and, together with the meshing gear closes off the turbine pressure chamber into which the outlet of the receptacle opens.

3. Retightener according to claim 2, wherein the outlet of the receptacle containing the liquid medium is arranged in the meshing plane of the gear drive.

4. Retightener according to claim 2, wherein the turbine housing has an outlet opening for the discharge of liquid on the side opposite the outlet of the receptacle for introduction of liquid medium into the turbine pressure vessel.

5. Retightener according to claim 4, wherein the outlet of the receptacle is closed off by a plug which is deformable and when ejected is transported by the turbine wheel to the outlet opening opposite the outlet of the receptacle.

* * * * *